United States Patent
Raisch

(10) Patent No.: US 11,592,102 B2
(45) Date of Patent: *Feb. 28, 2023

(54) TRANSMISSION LUBRICATION SYSTEM

(71) Applicant: DEERE & COMPANY, Moline, IL (US)

(72) Inventor: Stefan Raisch, Vaihingen/Enz (DE)

(73) Assignee: DEERE & COMPANY, Moline, IL (US)

(*) Notice: Subject to any disclaimer, the term of this patent is extended or adjusted under 35 U.S.C. 154(b) by 79 days.

This patent is subject to a terminal disclaimer.

(21) Appl. No.: 17/445,201

(22) Filed: Aug. 17, 2021

(65) Prior Publication Data
US 2022/0074486 A1   Mar. 10, 2022

(30) Foreign Application Priority Data
Sep. 10, 2020   (DE) .......................... 102020123650.6

(51) Int. Cl.
*F16H 57/04*   (2010.01)
*F16H 57/037*   (2012.01)
*F16H 57/02*   (2012.01)

(52) U.S. Cl.
CPC ....... *F16H 57/0445* (2013.01); *F16H 57/037* (2013.01); *F16H 57/045* (2013.01);
(Continued)

(58) Field of Classification Search
CPC .. F16H 57/027; F16H 57/037; F16H 57/0436; F16H 57/0445; F16H 57/045; F16H 57/0483
See application file for complete search history.

(56) References Cited

U.S. PATENT DOCUMENTS

| 4,529,061 A | 7/1985 | Glasrud et al. |
| 4,915,193 A | 4/1990 | Marquart |

(Continued)

FOREIGN PATENT DOCUMENTS

| DE | 4414000 C1 | 1/1996 |
| JP | 60139969 A | 7/1985 |
| WO | WO2005059409 A1 | 6/2005 |

OTHER PUBLICATIONS

European Search Report issued in application No. 21190946.0, dated Jan. 12, 2022, 9 pages.

*Primary Examiner* — Minh Truong

(57) ABSTRACT

A transmission lubrication system for a vehicle providing a continuous return flow of a lubricant. The transmission lubrication system includes a differential housing, a transmission housing, a lubricant tank, a suction line, a lubricant pump, and an air suction pump. The transmission housing is connected to the differential housing in an air-tight manner and a lubricant through-passage is provided between the transmission housing and the differential housing. The lubricant tank is provided in the differential housing and has a lubricant suction opening in a lower region. The lubricant pump conveys lubricant from the lubricant tank through the suction line and conducts the lubricant to the lubrication points in the differential housing and transmission housing. The air suction pump pumps air from the lubricant tank into the transmission housing so that an excess air pressure is maintained in the transmission housing.

18 Claims, 2 Drawing Sheets

(52) U.S. Cl.
CPC ..... *F16H 57/0436* (2013.01); *F16H 57/0483* (2013.01); *F16H 2057/02043* (2013.01)

(56) References Cited

U.S. PATENT DOCUMENTS

| | | |
|---|---|---|
| 6,718,847 B2 | 4/2004 | Rimkus et al. |
| 7,878,304 B2 | 2/2011 | Reis et al. |
| 8,997,934 B2 * | 4/2015 | Nielsen .................. F03D 80/70 184/6.12 |
| 9,052,009 B2 | 6/2015 | Barillot |
| 9,103,429 B2 | 8/2015 | Wiens et al. |
| 9,297,454 B2 | 3/2016 | Barthel et al. |
| 9,377,099 B2 | 6/2016 | Gianone et al. |
| 9,927,020 B2 | 3/2018 | Keeney et al. |
| 10,190,673 B2 | 1/2019 | Creech et al. |
| 11,002,356 B2 * | 5/2021 | Tochtermann ...... F16H 57/0409 |
| 11,226,031 B2 | 1/2022 | Paulik et al. |
| 2007/0169583 A1 | 7/2007 | Reis et al. |
| 2014/0366956 A1 | 12/2014 | Wiens et al. |
| 2021/0404546 A1 | 12/2021 | Balistreri et al. |
| 2022/0074483 A1 * | 3/2022 | Lang .................. F16H 57/0409 |

* cited by examiner

TRANSMISSION LUBRICATION SYSTEM

CROSS-REFERENCE TO RELATED APPLICATIONS

This application claims the benefit of and priority to German Patent Application No. 102020123650.6, filed Sep. 10, 2020, which is hereby incorporated by reference.

FIELD OF THE DISCLOSURE

The present disclosure relates to a transmission lubricant system for a vehicle.

BACKGROUND

Lubricant systems serve to provide lubricant at various points in a vehicle, in particular in engines and transmissions of all types. Consequently, different requirements are set according to the application.

Transmissions and other machine parts are mounted in housings which serve at the same time as a collection container for the lubricant. Generally, in this case the housing floor is configured as an oil sump in which the oil flows back and is pumped out again therefrom and brought into circulation.

In order to remove heat and also to guarantee the lubricant film, a basic quantity of oil is set. However, an excessive quantity of oil has to be avoided. In the case of a level which is too high, moving parts may be immersed in the oil and are slowed down by the resistance. At the same time, the swirling of the oil leads to foaming which results in a temporary loss of lubricant in the oil circuit, so that the oil level drops and potentially the circulation of lubricant comes to a halt.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

It is the object of the present disclosure to provide a lubricant circuit which permits a continuous lubrication and at the same time avoids splash losses or foaming.

A transmission lubrication system for a vehicle is proposed for ensuring a continuous return flow of a lubricant, having a differential housing, a transmission housing, a lubricant tank, a suction line, a lubricant pump, an air suction pump, wherein the transmission housing is connected to the differential housing in an air-tight manner and a lubricant through-passage is provided between the transmission housing and the differential housing, the lubricant tank is provided in the differential housing and has a lubricant suction opening in a lower region, and the lubricant pump conveys lubricant from the lubricant tank through the suction line and conducts the lubricant to the lubrication points in the differential housing and the transmission housing, and the air suction pump pumps air from the lubricant tank into the transmission housing so that an excess air pressure is maintained in the transmission housing and the differential housing is at ambient pressure which is lower than the excess air pressure in the transmission housing and the air pressure in the lubricant tank is lower than the ambient pressure in the differential housing so that by means of the air pressure differential the lubricant is conducted from the transmission housing into the differential housing and onward into the lubricant tank.

The provision of the lubricant tank in the differential housing together with the air pressure differential provides an improved supply of lubricant. The differential transmission in this case is no longer immersed in the lubricant and/or in the lubricant surface which is generally formed in the prior art. By the provision of the lubricant in the tank, splash losses of the differential transmission are avoided as well as foaming of the lubricant and a simultaneous drop in the lubricant level. The lubricant circuit extends across a plurality of housing parts and ensures a continuous lubrication with a uniform return flow into the lubricant tank. The arrangement of the lubricant tank together with the prevailing air pressure difference also leads to a low lubricant level outside the lubricant tank and a high lubricant level inside the lubricant tank in the region of the differential housing.

In one embodiment, the lubricant tank is designed to surround a differential arrangement in the differential housing, such that the lubricant in the tank is separated from the differential arrangement.

The differential arrangement consists of a plurality of gearwheels which mesh together and which supply power to the axles for the drive. The spatial separation of the lubricant reservoir in the lubricant tank avoids the situation where the gearwheels are immersed in the lubricant and reduces losses. The gearwheels are continuously supplied with lubricant but do not cause swirling of all of the lubricant which collects in the tank. The lubricant supply thus enables the quantity of lubricant to be reduced, wherein at the same time a sufficient supply is ensured.

In one development, the lubricant tank is constructed in a C-shape which is suitable for enclosing a differential arrangement in the differential housing.

The design of the lubricant tank in a C-shape permits the installation in the differential housing from one direction of installation. In this case, the differential housing may have on one side an opening through which the lubricant tank may be installed. The opening may be used at the same time for maintenance purposes. The C-shape makes it possible to accommodate the lubricant tank in a space-saving manner in the differential housing, with at the same time a maximum receiving volume for the lubricant.

In one embodiment, the air suction pump suctions the air from an upper region of the lubricant tank.

The suctioning ensures a constant low pressure between the lubricant surface and the lubricant tank which is sealed in an air-tight manner. As a result, the level of the lubricant surface rises so that a continuous return flow of lubricant into the lubricant tank is ensured. The suctioning results in an air pressure differential across the lubricant tank, the differential housing and the transmission housing, wherein the lowest pressure in comparison with the ambient pressure is formed in the lubricant tank. At the same time the suctioning ensures a removal of air bubbles from the lubricant, so that a uniform application of the lubricant is implemented.

In one development, the lubricant tank has a through-opening which is designed to permit the through-passage of a shaft.

At the same time the lubricant tank permits an application with a shaft passing through the differential housing. This also enables an installation in applications which require a further shaft. This permits the installation of a power take-off shaft in the differential housing or the use of the transmission lubrication system in differential housings and machines designed in this manner.

In one embodiment, the lubricant pump is provided inside the differential housing.

Differential housings have a large volume which may be used in a more space-saving manner by the integration of the lubricant pump with the lubricant tank. Unused volume inside the differential housing is reduced, wherein at the same time the lubricant pump is protected from environmental influences.

In a further embodiment, the lubricant tank is designed to surround a differential arrangement such that the lubricant tank serves as a splash guard.

The lubricant tank surrounds at least one gearwheel of the differential arrangement such that the ring gear is surrounded by a wall of the lubricant tank. In this case, splashing of the lubricant is avoided in the differential housing and the lubricant drains away again more quickly, and thus is available again more quickly for the circulation of lubricant.

In one development, the differential housing is directly connected to the transmission housing in an air-tight manner.

The connection which is air-tight and fluid-tight ensures the generation of the air pressure differential between the transmission housing, the differential housing and the lubricant tank. The air pressure differential ensures a continuous and uniform swirl-free drainage and return flow of the lubricant after it has been discharged to the corresponding lubricant supply lines.

In a further embodiment, the shaft is a power take-off shaft.

In the case of agricultural machines and tractors, a power take-off shaft is provided in order to drive hitched machines by mechanical means. An improved use of space is possible due to the design for passing through a power take-off shaft in the lubricant tank. Specific re-routing devices for the power take-off shaft are avoided and the maintenance is reduced.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The implementations disclosed in the above drawings and the following detailed description are not intended to be exhaustive or to limit the present disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components and/or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

Figure 1:
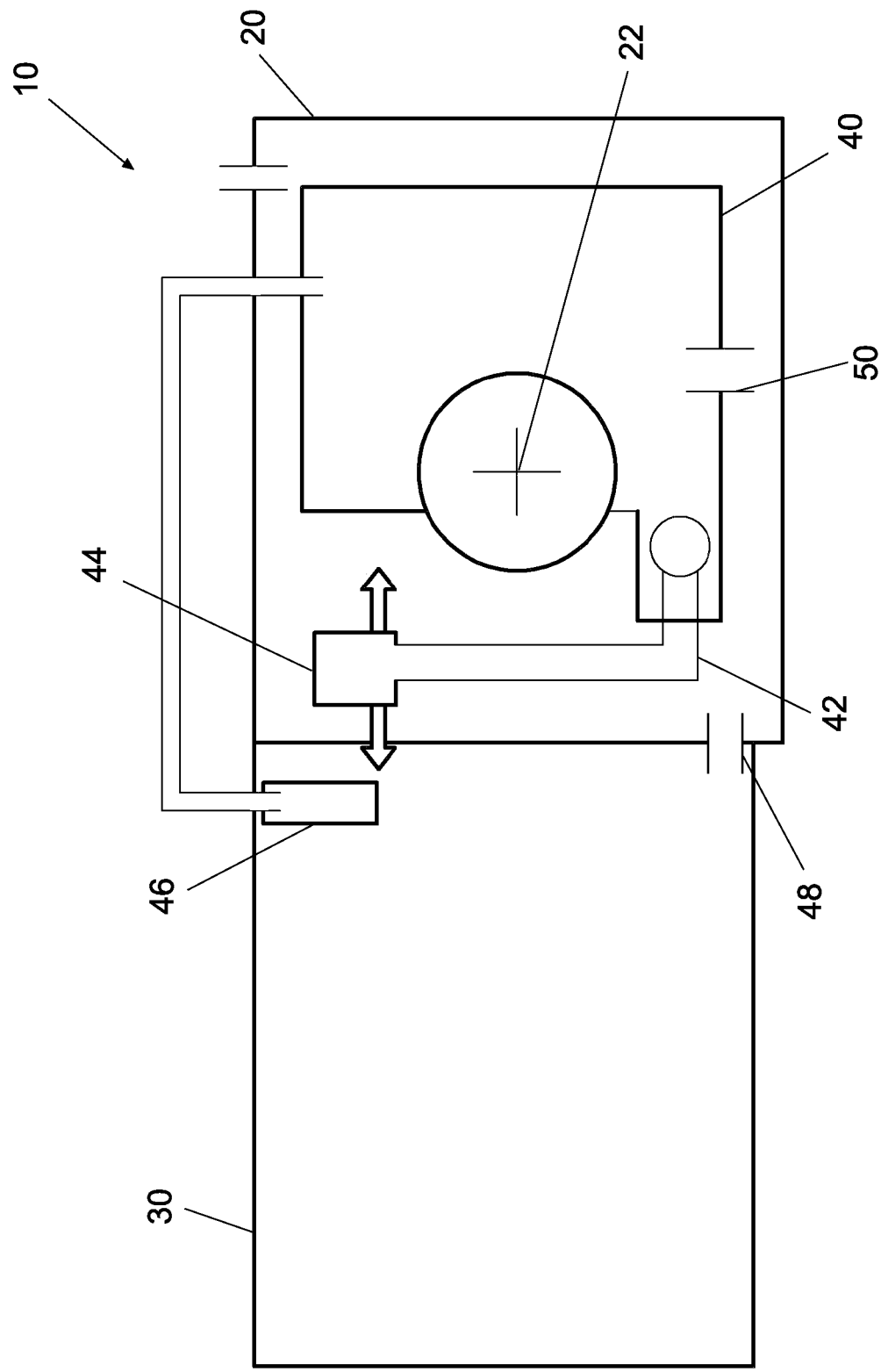
FIG. 1 shows an overall view of the construction, with the transmission housing and differential housing.

The transmission lubricant system 10 in FIG. 1 comprises a differential housing 20, a transmission housing 30, a lubricant tank 40, a suction line 42 which leads to a lubricant pump 44, an air suction pump 46 which suctions air from the lubricant tank 40 and conveys the air into the transmission housing, and a lubricant through-passage which conducts lubricant from the transmission housing 30 into the differential housing 20.

The differential housing 20 contains a differential arrangement 22 for driving the wheels of an axle. The lubricant tank 40 is accommodated in the differential housing 40 such that it encloses the gearwheels of the differential arrangement 22 and thus optimally utilizes the available constructional space. The lubricant tank 40 is correspondingly shaped so that it may be inserted into the differential housing 20. A lubricant suction opening 50 which permits lubricant to flow into the lubricant tank 40 is connected in a lower region. A suction line 42 which conveys lubricant from a lower region of the lubricant tank 40 to a lubricant pump 44 is accommodated in the lubricant tank 40. The lubricant pump 44 transports the lubricant to fixed lubrication points in the transmission housing and differential housing and to further points in the vehicle mechanical system.

An air suction pump 46 is provided parallel to the connected lubricant pump 44, said air suction pump suctioning air from an upper region of the lubricant tank 40, which is not filled with lubricant, and transporting this air into the transmission housing 30. The transmission housing 30 is connected in an air-tight manner to the differential housing 20. Thus an excess air pressure which lies both above the air pressure in the differential housing 20 and the air pressure in the lubricant tank 40 prevails in the transmission housing 30. Ambient pressure is applied to the differential housing 20 via an air vent 24. Due to the air pressure differential, the lubricant draining from the lubrication points and components is forced into the lubricant tank 40. The configuration of a lubricant sump in the differential housing is avoided.

The lubricant pump and air suction pump are controlled by a controller which may be provided on the differential housing or on the outside.

The lubricant tank 40 preferably has a C-shaped design. This permits a space-saving accommodation in the differential housing 20 and a mounting through an opening in the differential housing 20. The lubricant tank 40 may also be adapted to the shape of the differential housing in terms of height, width and shape. The lubricant tank 40 may additionally have a drainage opening in order to be able to remove lubricant in greater quantities from the lubricant tank 40.

The transmission housing 30 may be connected to any side of the differential housing 20, as long as an option is provided for an air-tight connection to the differential housing 20.

The lubricant pump 44 may be accommodated in the differential housing 20. This lubricant pump, however, may also be mounted outside the differential housing 20 as long as the suctioning of lubricant from the lubricant tank 40 is ensured.

The air suction pump 46 may be attached inside or outside the differential housing 20 as long as it is ensured that the air is suctioned from the lubricant tank 40 and pumped into the transmission housing 30.

The lubricant through-passage 48 is located between the transmission housing 30 and the differential housing 20 and permits the lubricant to flow from a lower region of the transmission housing 30 into the differential housing 20. Due to the difference in air pressure, the lubricant is forced into the differential housing 20 and flows onward into the suction opening 50 of the lubricant tank 40.

Figure 2:
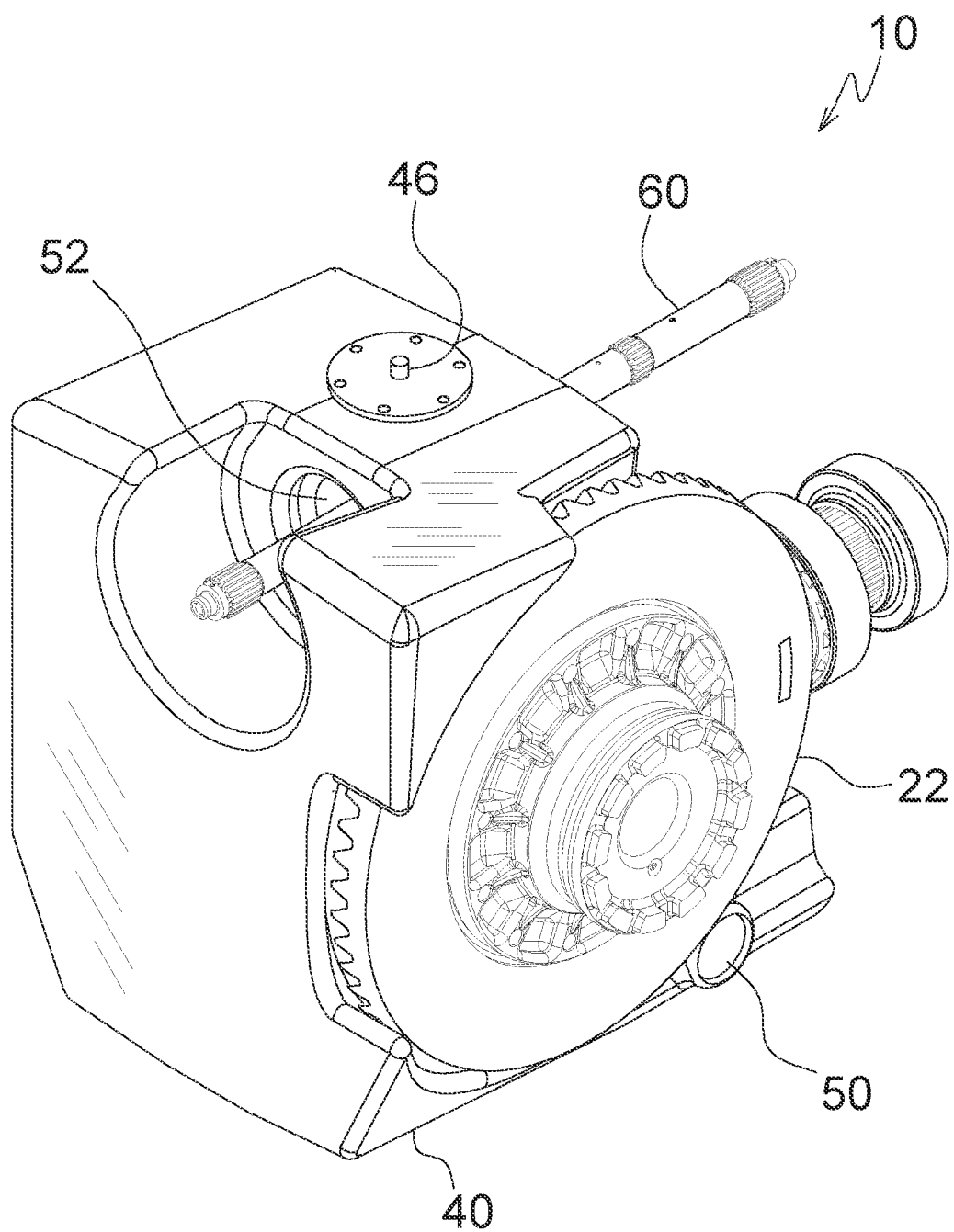
FIG. 2 shows a partial view of the lubricant tank with the differential arrangement and the shaft.

FIG. 2 shows a detailed view with the differential arrangement 22. The lubricant tank 40 has a C-shaped basic structure which also makes it possible to mount said lubricant tank from one direction. To this end, a corresponding opening may be provided in the differential housing 20.

The lubricant tank 40 is shaped such that it forms an edge which encloses and protrudes around a gearwheel of the differential arrangement 22. This edge serves at the same time as a splash guard and prevents the fine distribution of the lubricant over a wide area by the rotation of the differential arrangement 22. The lubricant tank has in a lower region a lubricant suction opening 52 which serves to suction the lubricant through the lubricant pump 44 and to conduct the lubricant to the lubrication points.

The lubricant tank 40 has a through-opening 52 which penetrates right through the lubricant tank 40. The opening 52 permits a shaft 60 to be passed through, said shaft being laid at the same time through the differential housing. By means of the through-opening 52, for example, a power take-off shaft, which serves for the further drive of hitched machines, may be provided. The through-opening 52 permits the space-saving design of the lubricant tank 40 and the differential housing 20.

The shaft 60 and the through-opening 52 may be configured above or below the axle of the differential arrangement 22.

The suction opening for the air suction pump 46 is located on an upper face of the lubricant tank 40. The direct suction of lubricant is avoided by the connection in an upper region.

A collection of lubricant over a large area on the floor of the differential housing 20 is avoided by means of the transmission lubricant system 10. The differential arrangement 22 is not immersed in the lubricant but is merely wetted, whereby a foaming and distribution of the lubricant is prevented. The lubricant runs more quickly back into the lubricant tank 40, whereby the quantity of lubricant may also be reduced.

The terminology used herein is for describing particular implementations and is not intended to be limiting of the present disclosure. As used herein, the singular forms "a," "an," and "the" are intended to include the plural forms as well, unless the context clearly indicates otherwise. It will be further understood that any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A transmission lubrication system for a vehicle, for ensuring a continuous return flow of a lubricant, comprising:
    a differential housing;
    a transmission housing;
    a lubricant tank;
    a suction line;
    a lubricant pump; and
    an air suction pump;
    wherein the transmission housing is connected to the differential housing in an air-tight manner, and a lubricant through-passage is provided between the transmission housing and the differential housing;
    wherein the lubricant tank is provided in the differential housing and has a lubricant suction opening in a lower region, and the lubricant pump conveys lubricant from the lubricant tank through the suction line and conducts the lubricant to lubrication points in the differential housing and transmission housing; and
    wherein the air suction pump pumps air from the lubricant tank into the transmission housing so that an excess air pressure is maintained in the transmission housing and the differential housing is at ambient pressure which is lower than the excess air pressure in the transmission housing and the air pressure in the lubricant tank is lower than the ambient pressure in the differential housing so that via the air pressure differential the lubricant is conducted from the transmission housing into the differential housing and onward into the lubricant tank.

2. The transmission lubrication system of claim 1, wherein the lubricant tank is designed to surround a differential arrangement in the differential housing, such that the lubricant in the tank is separated from the differential arrangement.

3. The transmission lubrication system of claim 1, wherein the lubricant tank is constructed in a C-shape which is suitable for enclosing a differential arrangement in the differential housing.

4. The transmission lubrication system of claim 1, wherein the air suction pump suctions the air from an upper region of the lubricant tank.

5. The transmission lubrication system of claim 1, wherein the lubricant tank has a through-opening which is designed to permit the through-passage of a shaft.

6. The transmission lubrication system as claimed in claim 5, wherein the shaft is a power take-off shaft.

7. The transmission lubrication system of claim 1, wherein the lubricant pump is provided inside the differential housing.

8. The transmission lubrication system of claim 1, wherein the lubricant tank is designed to surround a differential arrangement such that the lubricant tank serves as a splash guard.

9. The transmission lubrication system of claim 1, wherein the differential housing is directly connected to the transmission housing in an air-tight manner.

10. A vehicle having transmission lubrication system for ensuring a continuous return flow of a lubricant, comprising:
- a differential housing;
- a transmission housing;
- a lubricant tank;
- a suction line;
- a lubricant pump; and
- an air suction pump;
- wherein the transmission housing is connected to the differential housing in an air-tight manner, and a lubricant through-passage is provided between the transmission housing and the differential housing;
- wherein the lubricant tank is provided in the differential housing and has a lubricant suction opening in a lower region, and the lubricant pump conveys lubricant from the lubricant tank through the suction line and conducts the lubricant to lubrication points in the differential housing and transmission housing; and
- wherein the air suction pump pumps air from the lubricant tank into the transmission housing so that an excess air pressure is maintained in the transmission housing and the differential housing is at ambient pressure which is lower than the excess air pressure in the transmission housing and the air pressure in the lubricant tank is lower than the ambient pressure in the differential housing so that via the air pressure differential the lubricant is conducted from the transmission housing into the differential housing and onward into the lubricant tank.

11. The vehicle of claim 10, wherein the lubricant tank is designed to surround a differential arrangement in the differential housing, such that the lubricant in the tank is separated from the differential arrangement.

12. The vehicle of claim 10, wherein the lubricant tank is constructed in a C-shape which is suitable for enclosing a differential arrangement in the differential housing.

13. The vehicle of claim 10, wherein the air suction pump suctions the air from an upper region of the lubricant tank.

14. The vehicle of claim 10, wherein the lubricant tank has a through-opening which is designed to permit the through-passage of a shaft.

15. The vehicle as claimed in claim 14, wherein the shaft is a power take-off shaft.

16. The vehicle of claim 10, wherein the lubricant pump is provided inside the differential housing.

17. The vehicle of claim 10, wherein the lubricant tank is designed to surround a differential arrangement such that the lubricant tank serves as a splash guard.

18. The vehicle of claim 10, wherein the differential housing is directly connected to the transmission housing in an air-tight manner.

* * * * *